United States Patent
Armstrong

(10) Patent No.: US 8,885,189 B2
(45) Date of Patent: Nov. 11, 2014

(54) CONSTRAINT PRINT SETTING VALIDATION AND RESOLUTION FOR CLOUD-AWARE PRINT DEVICE

(75) Inventor: Charles Thomas Armstrong, Rancho Santa Margarita, CA (US)

(73) Assignee: Canon Kabushiki Kaisha, Tokyo (JP)

( * ) Notice: Subject to any disclaimer, the term of this patent is extended or adjusted under 35 U.S.C. 154(b) by 171 days.

(21) Appl. No.: 13/564,642

(22) Filed: Aug. 1, 2012

(65) Prior Publication Data

US 2014/0036296 A1    Feb. 6, 2014

(51) Int. Cl.
    *G06K 15/00*           (2006.01)
    *G06F 3/12*            (2006.01)

(52) U.S. Cl.
    USPC ........................................ 358/1.14; 358/1.15

(58) Field of Classification Search
    CPC ..... G06F 3/1204; G06F 3/1205; G06F 3/122; G06F 3/1289; G06F 3/1293; G06F 3/1294; G06F 3/1228; G06F 3/1247; G06F 3/1226; G06F 3/1232; G06F 3/1255; G06F 3/128

USPC ............... 358/1.1, 1.9, 1.13, 1.14, 1.15, 1.18, 358/402; 715/505, 764; 709/203, 223

See application file for complete search history.

(56) References Cited

U.S. PATENT DOCUMENTS

| | | | |
|---|---|---|---|
| 7,630,908 B1 * | 12/2009 | Amrien et al. | .............. 705/3 |
| 8,665,461 B2 * | 3/2014 | Salgado | ............. 358/1.13 |
| 2010/0225958 A1 | 9/2010 | Selvaraj et al. | |
| 2010/0290081 A1 | 11/2010 | Uchida | |
| 2011/0026071 A1 | 2/2011 | Xiao et al. | |
| 2011/0026073 A1 | 2/2011 | Wu | |
| 2011/0276986 A1 | 11/2011 | Kamath et al. | |
| 2011/0299110 A1 | 12/2011 | Jazayeri et al. | |
| 2013/0077128 A1 * | 3/2013 | Ichida | ............. 358/1.15 |

\* cited by examiner

*Primary Examiner* — Gabriel Garcia

(74) *Attorney, Agent, or Firm* — Canon USA, Inc., I.P. Division

(57) ABSTRACT

Systems and methods for printing in a cloud environment, wherein a second cloud service assists a printer and a cloud-print service with the user interaction required to update an invalid print ticket to a valid print ticket.

7 Claims, 5 Drawing Sheets

CONSTRAINT PRINT SETTING VALIDATION AND RESOLUTION FOR CLOUD-AWARE PRINT DEVICE

BACKGROUND

1. Field

The present disclosure relates generally to improving the user experience when printing through a cloud-printing system.

2. Background

With the proliferation of web-connected mobile devices, such as those running Google Chrome® OS and other mobile operating systems, it is not feasible to build and maintain complex print subsystems and print drivers for each platform. Current cloud-printing solutions, including one offered by Google®, are aimed at creating a seamless printing experience that is device independent and that does not require the installation of hardware specific printer drivers. The goal of current cloud-printing systems is to build a printing experience that enables any application (web, desktop, or mobile) on any device to print to any printer anywhere in the world.

Recently, Microsoft® introduced a new XML based print schema to address the problems associated with communication between the print subsystem and external applications. The print schema technology uses an XML based public schema to describe printer capabilities, device configurations, and job formatting settings. Applications can use the XML based schema to provide a print ticket along with the print data to detail required printer configurations. Additionally, user specified printer setting options (e.g. paper size, color, borderless, stapled, etc.) can be detailed in the print ticket.

However, the print ticket received by the printer through the cloud-print service may not be a valid print ticket. This may result in unexpected behavior or in the print job not being rendered on the printer at all, depending on the selected printer setting options. In order to prevent this, the print ticket must be validated. The validating process can result in the validated print ticket including very different printer setting options from those desired by the user. In a normal printing environment these differences would be resolved through a user interface that is communicating with a printer driver where the user would be able to make changes to the invalid print ticket. However, in a cloud-print environment, this kind of user interaction is often difficult due to the constraints of either the cloud-print system or those of the sending device, e.g. limited memory, limited processing power, overhead/cost of the communications, etc.

SUMMARY

In one aspect, a method for printing comprising receiving a print job at a first remote web service, receiving a first notification of the print job from the first remote web service, retrieving a print ticket associated with the print job, and validating the print ticket. The method further comprises, if the validation of the print ticket is not successful, correcting the print ticket, by a second remote web service, retrieving the corrected print ticket from the second remote web service, retrieving job print data, rendering the corrected print job; and sending a second notification of the rendering to the first remote web service.

This brief summary has been provided so that the nature of this disclosure may be understood quickly. A more complete understanding can be obtained by reference to the following detailed description and to the attached drawings.

DESCRIPTION

The following disclosure describes certain explanatory embodiments. Additionally, the explanatory embodiments may include several novel features, and a particular feature may not be essential to practice the systems and methods described herein.

Figure 1:
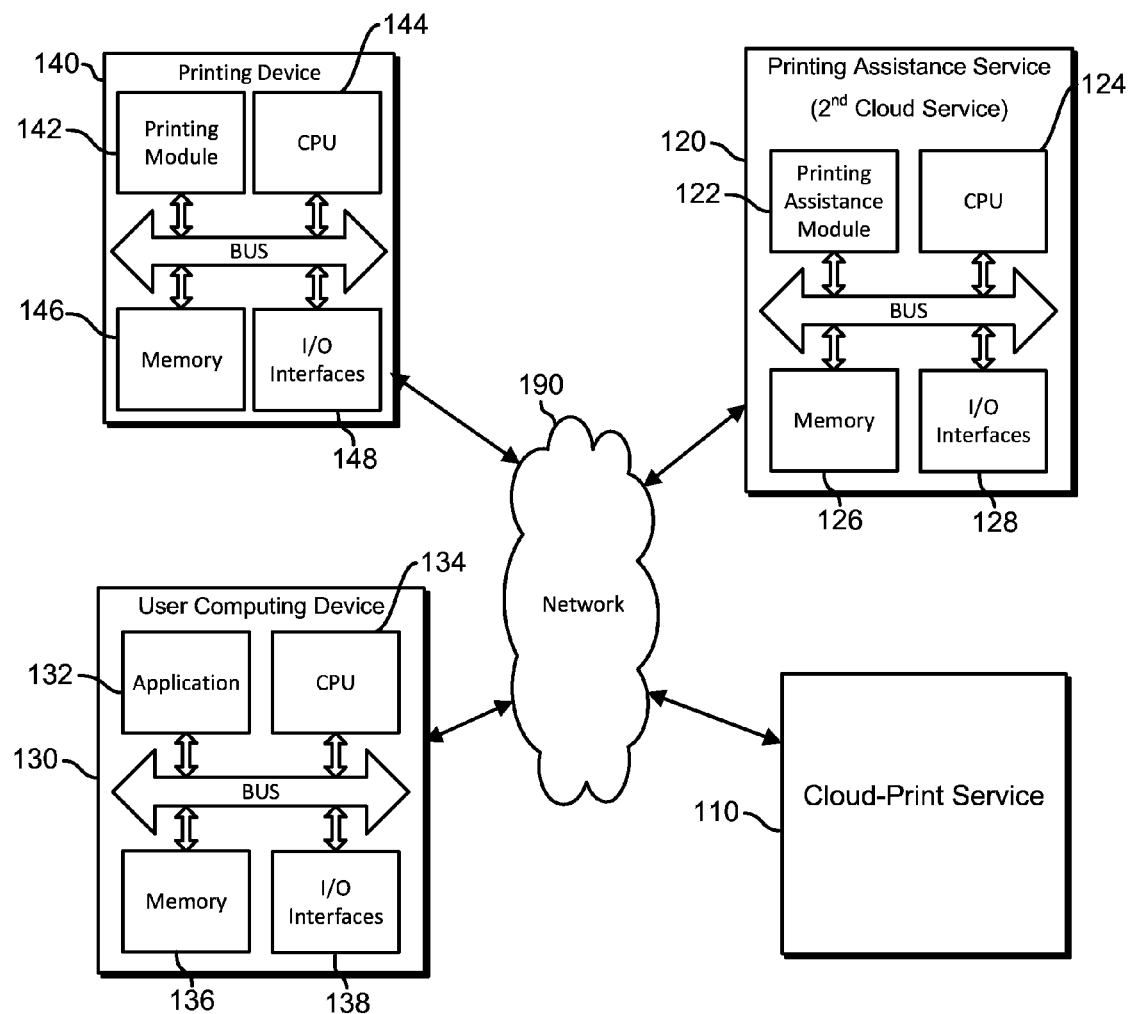
FIG. 1 is a block diagram that illustrates an example embodiment of a system for printing assistance in a cloud computing environment.

FIG. 1 is a block diagram that illustrates an example embodiment of a cloud environment which includes a cloud-print service and a printing assistance service, both of which can be implemented as remote web services. The system includes a cloud-print service 110, a printing assistance service 120, a user computing device 130, and a printing device 140. The printing assistance service 120 and the user computing device 130 each respectively include one or more computing devices. Computing devices include, for example, desktops, laptops, servers, mainframes, personal digital assistants, tablet computers, cellular phones (including smart phones), etc. The computing devices may communicate via one or more networks 190, and the one or more networks 190 include one or more of a LAN, a WAN, a personal network, the Internet, a wired network, and a wireless network. One or more of the cloud-print service 110 and the printing assistance service 120 operate in a distributed or cloud computing environment, where computing, software, platforms, or infrastructure may be provided as a service. Therefore the cloud-print service 110, the printing assistance service 120, the printing device 140, and the user computing device 130 may be physically located miles apart.

The printing assistance service 120 includes a CPU 124, (memory) 126, and I/O interfaces 128. The CPU 124 includes one or more computer processors, such as single core or multi-core central processing units and/or micro-processing units. The CPU 124 may be incorporated in a stand-alone apparatus or in a multi-component apparatus. The CPU 124 may implement computer-executable instructions and/or control the implementation of computer-executable instructions by other members of a device (e.g., the printing assistance service 120).

The memory 126 includes one or more computer-readable media, and thus is configured to store computer-readable data and/or computer-executable instructions. The memory 126 may include, for example, one or more of a magnetic disk (e.g., a flexible disk (floppy disk), a hard disk, redundant array of independent disks (RAID)), an optical disc (e.g., CD, DVD, Blu-ray), a magneto-optical disk, a micro-drive, a read-only memory (ROM), solid state memory (e.g., random access memory (RAM), DRAM, SRAM, flash memory, video RAM (VRAM), a nonvolatile memory card, a solid state drive), erasable programmable read only memory (EPROM), electrically erasable programmable read only memory (EEPROM), a magnetic tape or card, and an optical card.

The printing assistance service 120 also includes one or more I/O interfaces 128. The I/O interfaces 108 provide communication interfaces to input and output devices, which may include a keyboard, a display device, a mouse, one or more controls (e.g., buttons, switches, dials), a touch screen, a scanner, a microphone, a drive, and a network (either wired or wireless).

Additionally, the printing assistance service 120 includes a printing assistance service module 122. A module includes instructions that may be executed by a computing device to cause the computing device to perform certain operations, though for purposes of description a module may be described as performing the operations. Modules may include logic, computer-readable data, and/or computer-executable instructions and may be implemented in software (e.g., Assembly, C, C++, C#, Java, BASIC, Perl, Visual Basic), firmware, and/or hardware. Other embodiments may include additional or less modules, combine modules into fewer modules, or divide the modules into more modules.

The user computing device 130 includes a CPU 134, memory 136, I/O interfaces 138, and a user registration module (application module) 132. The application module 132 (which may implement a mobile application, e.g., a mobile "app") sends one or more of print jobs, user IDs, tokens, and printing device IDs to the cloud-print service 110 and/or the printing assistance service 120.

The printing device 140 includes a CPU 144, memory 146, I/O interfaces 148, and a printing module 142. The printing module 142 receives print jobs, sends and receives status updates, and communicates with the cloud-print service 110 and the printing assistance service 120. The printing device 140 also includes software and hardware for printing.

The system allows a user to print jobs on the printing device 140 via the cloud-print service 110. When the printing device 140 has been successfully shared with a user, a user computing device 130 associated with the user (e.g., by the user's credentials) can send a print job to the printing device 140 via the cloud-print service 110. Since the user computing device 130 needs to send the print job only to the cloud-print service 110 (which then sends the print job to the printing device 140), the printing device 140 and the user computing device 130 do not need to directly communicate with one another (e.g., may operate on different networks).

In the following description the second cloud service is synonymous with the printing assistance service 120 is identical to the second cloud service.

A print ticket, also called a job ticket, is generally included in a print job, along with the data to be printed, and contains instructions required to print the data as desired. These instructions can include such specifications as paper size, duplexing, stapling, color, etc. A print ticket is usually a text document or xml document but can be any form of computer file or object that conveys similar information.

A printer will have a set of capabilities and default option selections for the various available settings. In a typical printing environment, where a printer driver interfaces between a user application and the printer, a user who desires to print to the printer is presented with a user interface which informs the user of the capabilities of the printer and allows the user to select options other than the defaults for the available settings. These selections along with other necessary specifications are written into the print ticket which is included in the print job with the data the user desires to print.

Additionally, because the selection of some printer options constrains the selection of other available options, the user interface prevents the user from selecting options that are incompatible with each other. For example, on a printer that allows borderless printing, the user interface may constrain the options of paper size so as to not allow an incompatible paper selection after borderless printing has been selected. This ability to present only valid option combinations is possible because the printer driver is in direct contact with the printer and the user is in direct contact with the printer driver through the user interface. This, however, is not the case in a cloud-print environment.

Figure 2:
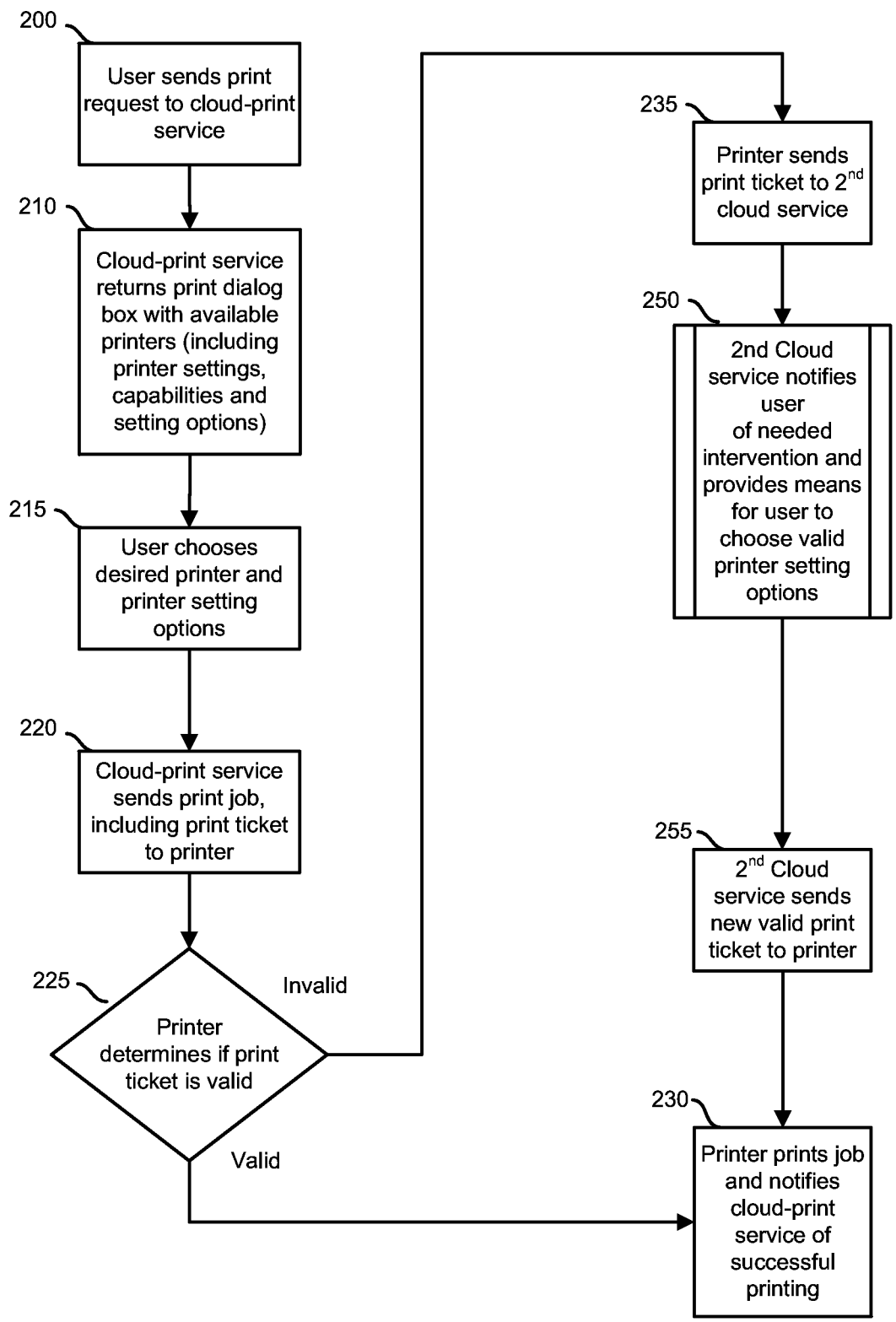
FIG. 2 is a flow diagram that illustrates an example embodiment of a method for printing assistance in a cloud environment.

One of the main purposes of a cloud-print service is to allow a registered user to print to a printer registered to the user's account from any device and from anywhere the user can access the cloud-print service. For example, the user may desire to print an email received on the user's smart phone to the user's home printer when the user is miles away from the user's home. FIG. 2 is a flow diagram that illustrates one embodiment of a method to perform such a print job.

The method begins with step 200 in which a request to print is directed to the cloud-print service by a user. Usually, the user will have registered with the cloud-print service at some time prior to making the print request. Additionally, the user will also have associated at least one printer with their cloud-print account. It is customary for the printer to send to the cloud-print service its capabilities and default settings at the time it is being associated with the user account. These original capabilities and default settings are what are used to populate the print dialog box of step 210 which is presented to the user. In step 215, the user chooses the desired printer to which the user desires to print and selects printer setting options from among those presented in the dialog box. Possible printer settings would include paper size, color, borderless, stapling, duplex, etc.

In step 220, the cloud-print service assembles the print job including at least a print ticket and the print data, and sends the print job to the printer. It should be understood that printer can refer to printers registered with the cloud-print service through a proxy as well as printers which are "cloud aware" and interface with the cloud-print service directly over the internet. Additionally, while this method describes the cloud-print service pushing the print job to the printer, the printer could also pull the print job from the cloud-print service after being notified that a print job is waiting. It is also possible that just the print ticket would be sent to the printer and the print data could be sent at a later time, e.g. just before rendering.

In step 225, the printer determines if the print ticket of the print job is valid by comparing the printer configuration contained in the print ticket with the current printer capabilities and available printer settings and printer setting options. For example, if the print ticket instructed a paper size of A4, color printing, and stapling, the printer would determine if those selections were valid and compatible with each other and are still valid printer setting options for the requested printer. An example of a process used to make this determination is the merge and validate process performed in a Microsoft® XPS environment. If the printer configuration and printer setting options instructed in the print ticket are possible, the print ticket will be determined to be valid.

If the print ticket is found to be valid, the process will continue to step 230, in which the printer will render the print job and notify at least the cloud-print service of the successful completion of the print request.

If, however, the print ticket is determined to be invalid, the process will proceed to step 235. In this step, the printer will contact a second cloud service to assist in determining the changes that need to be made to the print ticket in order to transform it from an invalid print ticket into a valid one. This second cloud service is envisioned as being provided by the printer manufacturer or alternatively by an entity associated with the user's device such as the manufacturer or communications provider. It is understood, however, that the second cloud service can be any service which can determine the printer's current capabilities and perform the steps necessary to transform the invalid print ticket into a valid one.

The internet address of the second cloud service and the protocol for interacting with the second cloud service will have been previously loaded into the software or firmware of the printer. Alternatively, any means by which the printer is made aware of the second cloud service, including through the use of a proxy, would be acceptable.

In step 250, the user is notified of the need for intervention and a means for the user to resolve the conflicts is provided. An example of a possible method for doing so is presented in FIG. 3 and will be described later.

After the user has resolved the conflicts by selecting valid printer setting options, the print ticket is updated and sent to the printer, where in step 230, the print job is rendered and at least the cloud-print service is notified of the successful completion of the print job.

Figure 3:
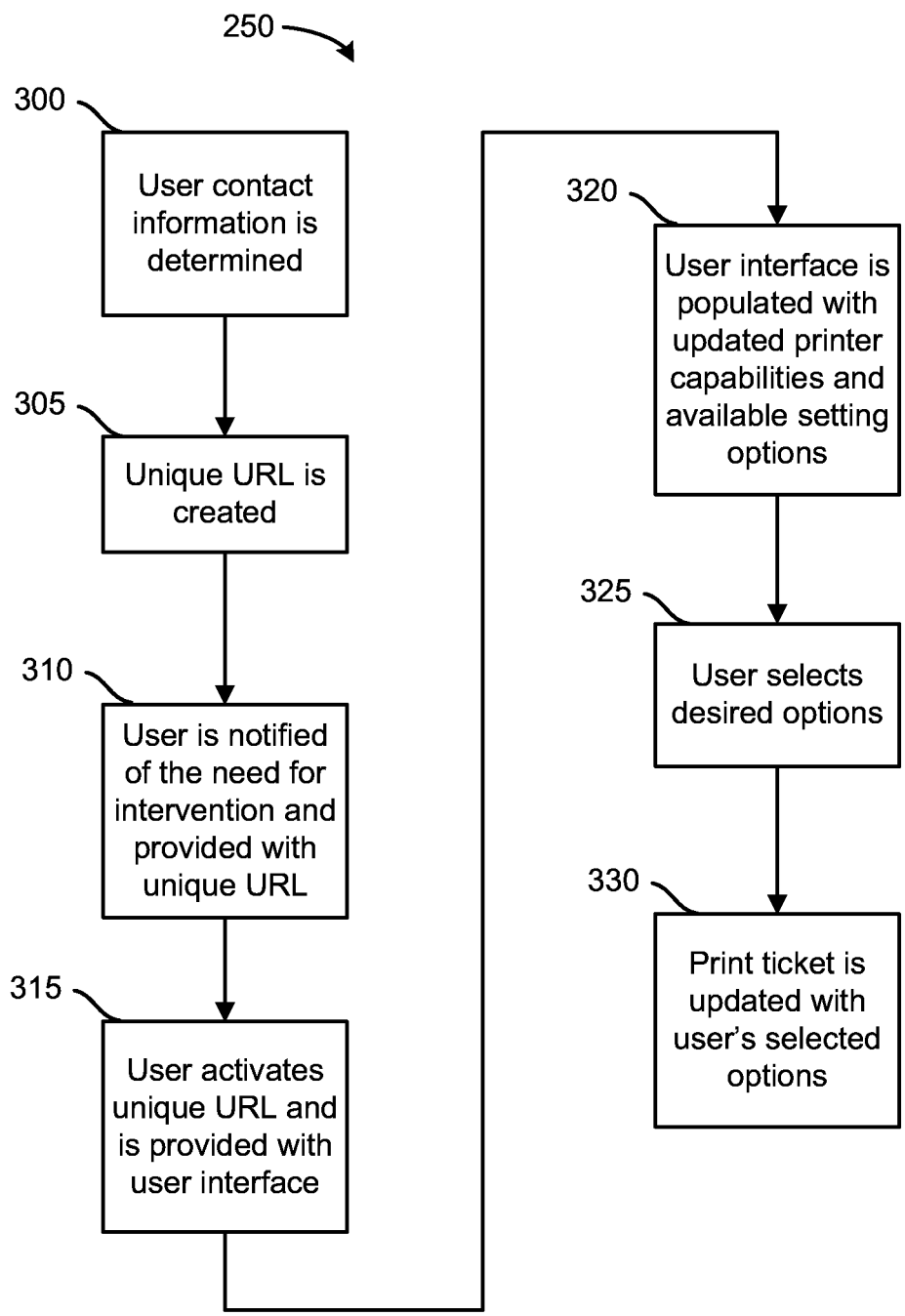
FIG. 3 is a flow diagram that illustrates an example embodiment of a method for printing assistance in a cloud environment.

A possible method for accomplishing step 250 of FIG. 2 is detailed in the flow diagram in FIG. 3. In step 300, the second cloud service determines the contact information for the user. The contact information may be requested and obtained from the cloud-print service, or it might be included in the print ticket itself. The means of contacting the user may be by email or SMS messaging or by any means which allows for the delivery of unique information that will facilitate the interaction of the user with the second cloud service.

In step 305, the second cloud service creates unique information related to the user and the print job. Here a unique URL is indicated, but other possibilities might be a unique pass code to a known site, a barcode, a QR code, etc.

In step 310, the user is notified of the problem with the requested print job and is provided the unique information along with instruction on how to utilize the information. Alternatively, the user could be instructed on a means of obtaining the unique information and on how to utilize it. In this example, a unique URL would be delivered to the user in an email that notifies the user of the need to correct printer setting option choices for the requested print job.

In step 315, the user follows the instructions and is provided with a user interface which will indicate the invalid printer setting option choices and allow the user to either update the printer setting option choices based on the currently available printer capabilities, or can cancel the print job. In this example, the user would activate the unique URL in a browser and be presented with the user interface on a web page or web application. Alternatively, a manufacturer or other entity could provide an application which could be installed on the user's device which would provide the user interface.

In step 320, the user interface is populated with the updated printer capabilities and available printer setting options. The second cloud service can obtain this information directly from the printer itself or from any source which maintains this information. For example, a printer manufacturer or servicing company may maintain a database of current printer configurations for their customers.

In step 325, the user selects the new printer setting options from those provided in the user interface. Additionally, as the user makes choices which require other options to be constrained, the user interface is updated so as to not allow incompatible printer setting options to be selected.

When the user indicates that all of the desired printer setting options have been selected, the second cloud service updates the print ticket with this new information in step 330. In this way, in invalid print ticket can be transformed into a valid print ticket that is in line with the user's desired printer setting options and the print job can proceed.

Figure 4:
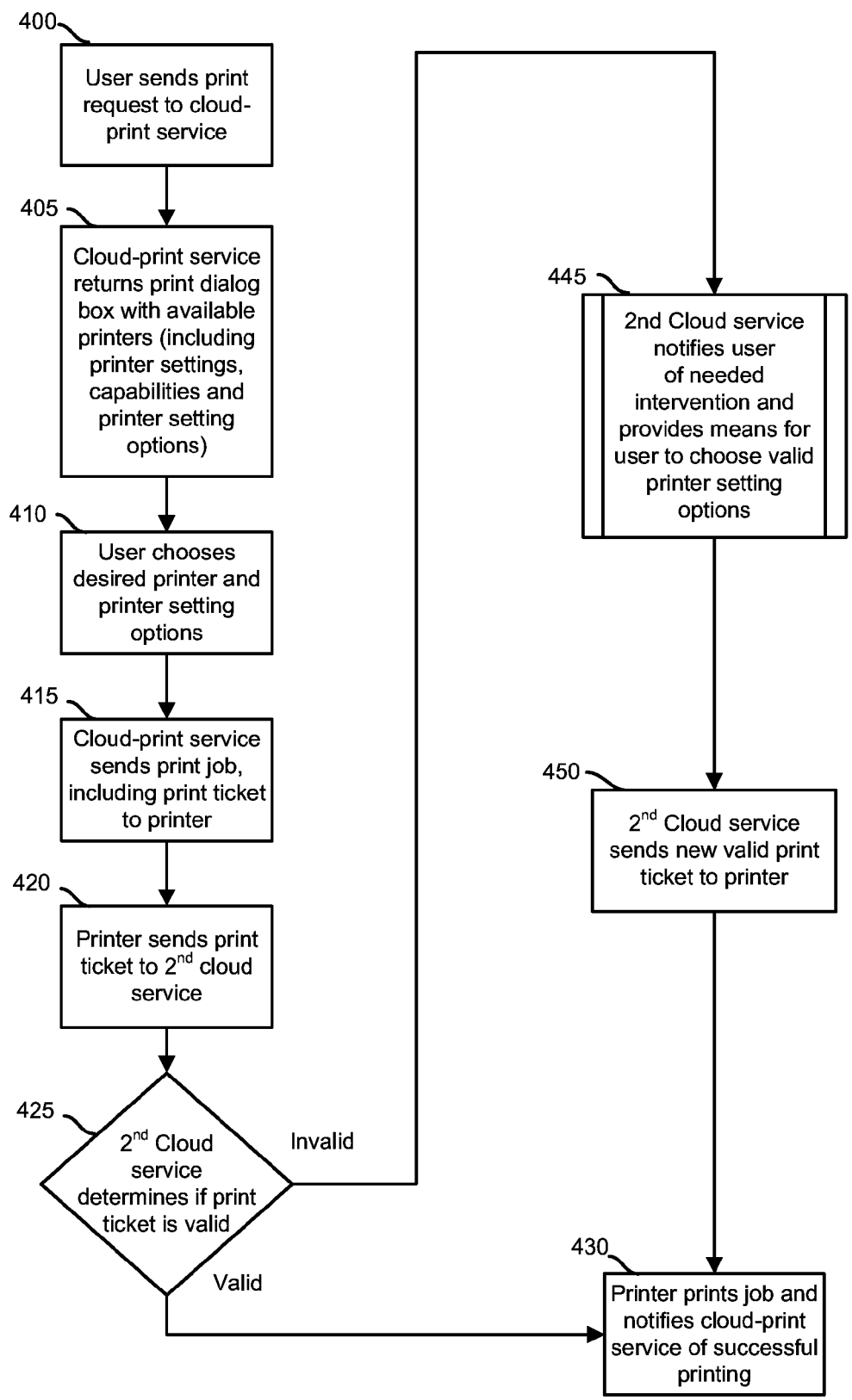
FIG. 4 is a flow diagram that illustrates an example embodiment of a method for printing assistance in a cloud environment.

FIG. 4 illustrates a second embodiment of the present invention. Steps identical to those in FIG. 3 will not be further discussed. In this embodiment, the printer does not do the validation of the print ticket, rather, in step 420, the printer sends the print ticket to the second cloud service and in step 425 the second cloud service determines if the print ticket is valid. If the print ticket is valid the second cloud service notifies the printer of the result and the process proceeds to step 430 which is identical to step 230 in FIG. 2.

Figure 5:
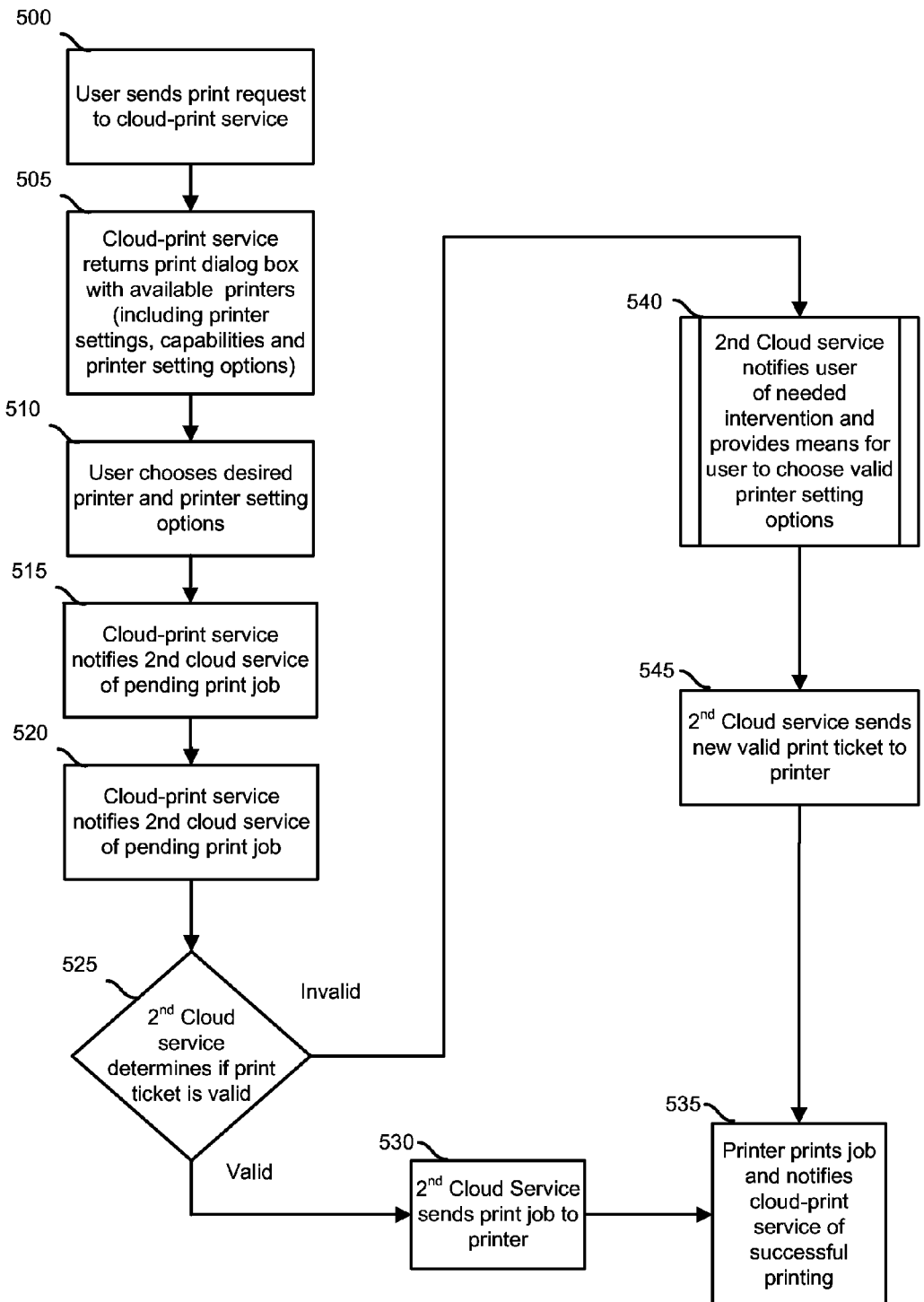
FIG. 5 is a flow diagram that illustrates an example embodiment of a method for printing assistance in a cloud environment.

FIG. 5 illustrates a third embodiment of the present invention. In this embodiment, the cloud-print service, in step 515, notifies the second cloud service of a pending print job. Generally, this would be possible if the printer communicated the existence of the second cloud service to the cloud-print service, and instructions on interfacing with it, at the time the printer is associated with the user's account. However, any means whereby the cloud-print service was instructed to send the print job first to the second cloud service would be acceptable. In step 520, the second cloud service pulls the print job including the print ticket from the first cloud service. One method for pulling the print job from the first cloud service is by making REST API calls. In step 525, the second cloud service determines if the print ticket is valid. in step 530, if the print ticket is valid, the second cloud service sends the print job to the printer, The rest of the process is identical to the third embodiment In a fourth embodiment, in addition to the steps described in the first three embodiments, the second cloud service also sends periodic status updates to the cloud-print service while the second cloud service is interacting with the user and updating the print ticket. Generally, a cloud-print service will poll a printer for the status of the print job and will mark a print job as failed if too much time passes. In this embodiment, in order to prevent this, a "pending" status is sent from the second cloud service to the cloud-print service indicating that the print job is still in process, thus keeping the print job "alive" in the cloud-print system until it is actually completed.

In a fifth embodiment, in addition to the print ticket validation and resolution functions, the second cloud service also performs additional functions as specified in special instructions. The special functions would include, but are not limited to, decrypting encrypted print job data, releasing a job previously put on hold, and determining whether the specified printer has enough media (ink, paper, etc.) to complete the requested job. Ideally, the special instructions would be added to the print ticket before being pulled by the second cloud service and would be performed before the print ticket validation and resolution functions.

The above described devices, systems, and methods can be achieved by supplying one or more storage media having stored thereon computer-executable instructions for realizing the above described operations to one or more computing devices that are configured to read the computer-executable instructions stored in the one or more storage media and execute them. In this case, the systems and/or devices perform the operations of the above-described embodiments when executing the computer-executable instructions read from the one or more storage media. Also, an operating system on the one or more systems and/or devices may implement the operations of the above described embodiments. Thus, the computer-executable instructions and/or the one or more storage media storing the computer-executable instructions therein constitute an embodiment.

Any applicable computer-readable storage medium (e.g., a magnetic disk (including a floppy disk, a hard disk), an optical disc (including a CD, a DVD, a Blu-ray disc), a magneto-optical disk, a magnetic tape, and a solid state memory (including flash memory, DRAM, SRAM, a solid state drive)) can be employed as a storage medium for the computer-executable instructions. The computer-executable instructions may be written to a computer-readable storage medium provided on a function-extension board inserted into the device or on a function-extension unit connected to the device, and a CPU provided on the function-extension board or unit may implement the operations of the above-described embodiments.

This disclosure has provided a detailed description with respect to particular explanatory embodiments. It is understood that the scope of the appended claims is not limited to the above-described embodiments and that various changes and modifications may be made without departing from the scope of the claims.

What is claimed is:

1. A method for printing, the method comprising:
    receiving a print job from a client computing device at a web print service remote from the client computing device;
    receiving, at a printing assistance service remote from both the client computing device and the web print service, a first notification of the print job;
    retrieving by the printing assistance service, a print ticket associated with the print job from the web print service;
    validating the retrieved print ticket, wherein the validating includes determining whether a combination of constraints is allowed, and,
    if the validation of the print ticket is not successful,
        correcting the print ticket, by the printing assistance service;
    retrieving job print data;
    sending the job print data and the corrected print ticket to an image forming device;
    rendering the corrected print job; and
    sending a second notification of the rendering to the web print service.

2. The method according to claim 1, further comprising:
    sending a third notification of the unsuccessful validation of the print ticket, from the web print service, to the client computing device; and
    receiving, by the printing assistance service, corrections to the print ticket from the client computing device.

3. The method according to claim 2, wherein the third notification is sent by email.

4. The method according to claim 2, wherein the corrections to the print ticket are received via a web page.

5. The method according to claim 4, wherein the third notification includes a URL of the web page.

6. The method according to claim 1, wherein the printing assistance service is provided by an independent hardware vendor.

7. A printing assistance device comprising:
    a receiving unit configured to receive notification of a print job from a web print service;
    a retrieving unit configured to retrieve job print data and a print ticket associated with the print job from the web print service;
    a validation unit configured to validate the retrieved print ticket, wherein the validating includes determining whether a combination of constraints is allowed;
    a correcting unit configured to, if the validation of the print ticket is not successful, correct the print ticket;
    a sending unit configured to send the job print data and the corrected print ticket to an image forming device;
    a monitoring unit configured to monitor the image forming device to confirm rendering of the print job; and
    a notification unit configured to notify the web print service of the rendering.

* * * * *